US012155117B2

(12) United States Patent
Hara et al.

(10) Patent No.: US 12,155,117 B2
(45) **Date of Patent: *Nov. 26, 2024**

(54) ANTENNA DEVICE

(71) Applicant: TDK Corporation, Tokyo (JP)

(72) Inventors: Yasuyuki Hara, Tokyo (JP); Yutaka Ui, Tokyo (JP); Yuta Ashida, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,297

(22) Filed: Aug. 14, 2023

(65) Prior Publication Data

US 2023/0387583 A1 Nov. 30, 2023

Related U.S. Application Data

(63) Continuation of application No. 18/051,946, filed on Nov. 2, 2022, now Pat. No. 11,769,942, which is a (Continued)

(30) Foreign Application Priority Data

Jun. 17, 2020 (JP) ................................ 2020-104608

(51) Int. Cl.
*H01Q 15/00* (2006.01)
*H01Q 1/22* (2006.01)
(Continued)

(52) U.S. Cl.
CPC ........... *H01Q 1/422* (2013.01); *H01Q 1/2283* (2013.01); *H01Q 1/38* (2013.01); *H01Q 5/371* (2015.01); *H01Q 15/0026* (2013.01)

(58) Field of Classification Search
CPC ........ H01Q 1/422; H01Q 1/2283; H01Q 1/38; H01Q 5/371; H01Q 15/0026; H01Q 1/523;
(Continued)

(56) References Cited

U.S. PATENT DOCUMENTS 11,522,281 B2 * 12/2022 Hara ...................... H01Q 5/371
11,769,942 B2 * 9/2023 Hara .................... H01Q 21/065 343/702
(Continued)

FOREIGN PATENT DOCUMENTS

JP 05-21514 A 1/1993
JP 6658704 B2 3/2020

OTHER PUBLICATIONS

U.S. PTO Notice of Allowance issued in related parent U.S. Appl. No. 17/343,293, mailed on Aug. 24, 2022.
(Continued)

*Primary Examiner* — David E Lotter
(74) *Attorney, Agent, or Firm* — Rimon P.C.

(57) ABSTRACT

Disclosed herein is an antenna device that includes a filter layer, an antenna layer, a divider layer, and ground patterns. The antenna layer has first and second radiation conductors and first and second ground pillars that surround the first and second radiation conductors, respectively. Each of the first and second ground patterns has a first area that overlaps a first space surrounded by the first ground pillars, a second area that overlaps a second space surrounded by the plurality of second ground pillars, and a third area that connects the first and second areas. A width of the third area in a width direction perpendicular to an arrangement direction of the first and second areas is smaller than a width of each of the first and second areas in the width direction.

20 Claims, 9 Drawing Sheets

Related U.S. Application Data continuation of application No. 17/343,293, filed on Jun. 9, 2021, now Pat. No. 11,522,281.

(51) Int. Cl.

| | |
|---|---|
| ***H01Q 1/38*** | (2006.01) |
| ***H01Q 1/42*** | (2006.01) |
| ***H01Q 5/371*** | (2015.01) |

(58) Field of Classification Search

CPC .... H01Q 9/0457; H01Q 21/065; H01Q 21/24; H01Q 1/48; H01Q 1/50; H01Q 21/061; H01Q 23/00

See application file for complete search history.

(56) References Cited

U.S. PATENT DOCUMENTS

| | | | | |
|---|---|---|---|---|
| 2006/0055601 | A1 | 3/2006 | Kameda et al. | |
| 2013/0028298 | A1 | 1/2013 | Manry, Jr. et al. | |
| 2013/0234908 | A1 | 9/2013 | Howard et al. | |
| 2018/0219272 | A1 | 8/2018 | Baheti et al. | |
| 2019/0089060 | A1 | 3/2019 | Hara et al. | |
| 2019/0097311 | A1* | 3/2019 | Ashida | H01Q 9/0414 |
| 2019/0165475 | A1 | 5/2019 | Shibata | |
| 2021/0242601 | A1 | 8/2021 | Johansson et al. | |

OTHER PUBLICATIONS

Parent U.S. Appl. No. 17/343,293, filed Jun. 9, 2021.

U.S. PTO Notice of Allowance issued in related parent U.S. Appl. No. 18/051,946, dated May 16, 2023.

U.S. PTO Non-Final Office Action issued in related parent U.S. Appl. No. 18/051,946, dated Apr. 12, 2023.

* cited by examiner

ANTENNA DEVICE

CROSS REFERENCE TO RELATED APPLICATIONS

This application is a Continuation of U.S. patent application Ser. No. 18/051,946, filed on Nov. 2, 2022, which is a Continuation of U.S. patent application Ser. No. 17/343,293, filed on Jun. 9, 2021, which claims the benefit of Japanese Patent Application No. 2020-104608, filed on Jun. 17, 2020, the entire contents of each are hereby incorporated in their entirety.

BACKGROUND

Field

The present disclosure relates to an antenna device and, more particularly, to an antenna device having a configuration in which an antenna layer including a radiation conductor and a filter layer including a filter circuit are integrated with each other.

Description of Related Art

As the antenna device in which an antenna layer including a radiation conductor and a filter layer including a filter circuit are integrated with each other, there is known an antenna device described in Japanese Patent No. 6,658,704. In FIG. 5 of Japanese Patent No. 6,658,704, an antenna module having a plurality of radiation conductors arranged in an array is disclosed. In this antenna module, filter circuits are individually provided for respective nine radiation conductors.

However, individually providing the filter circuits for a plurality of respective radiation conductors disadvantageously increases the number of signal terminals, thus requiring complex control. To solve this drawback, a method of sharing a single circuit among the plurality of radiation conductors is conceivable; in this case, how to distribute an antenna signal output from the single filter circuit among the plurality of radiation conductors becomes an issue.

SUMMARY

It is therefore an object of the present disclosure to provide an antenna device of a type in which a single filter circuit is shared among a plurality of radiation conductors.

An antenna device according to the present disclosure includes: a filter layer having a first filter circuit; an antenna layer having first and second radiation conductors; a divider layer interposed between the filter layer and the antenna layer, the divider layer having a first divider circuit for distributing a first antenna signal fed from the first filter circuit to the first and second radiation conductors; a first ground pattern provided between the filter layer and the divider layer; and a second ground pattern provided between the divider layer and the antenna layer. The antenna layer further has a plurality of first ground pillars and a plurality of second ground pillars that surround the first radiation conductor and the second radiation conductor, respectively, in a plan view as viewed from a stacking direction. Each of the first and second ground patterns has a first area that overlaps a first space surrounded by the plurality of first ground pillars in a plan view as viewed from the stacking direction, a second area that overlaps a second space surrounded by the plurality of second ground pillars in a plan view as viewed from a stacking direction, and a third area that connects the first and second areas. A width of the third area in a width direction perpendicular to an arrangement direction of the first and second areas is smaller than a width of each of the first and second areas in the width direction.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
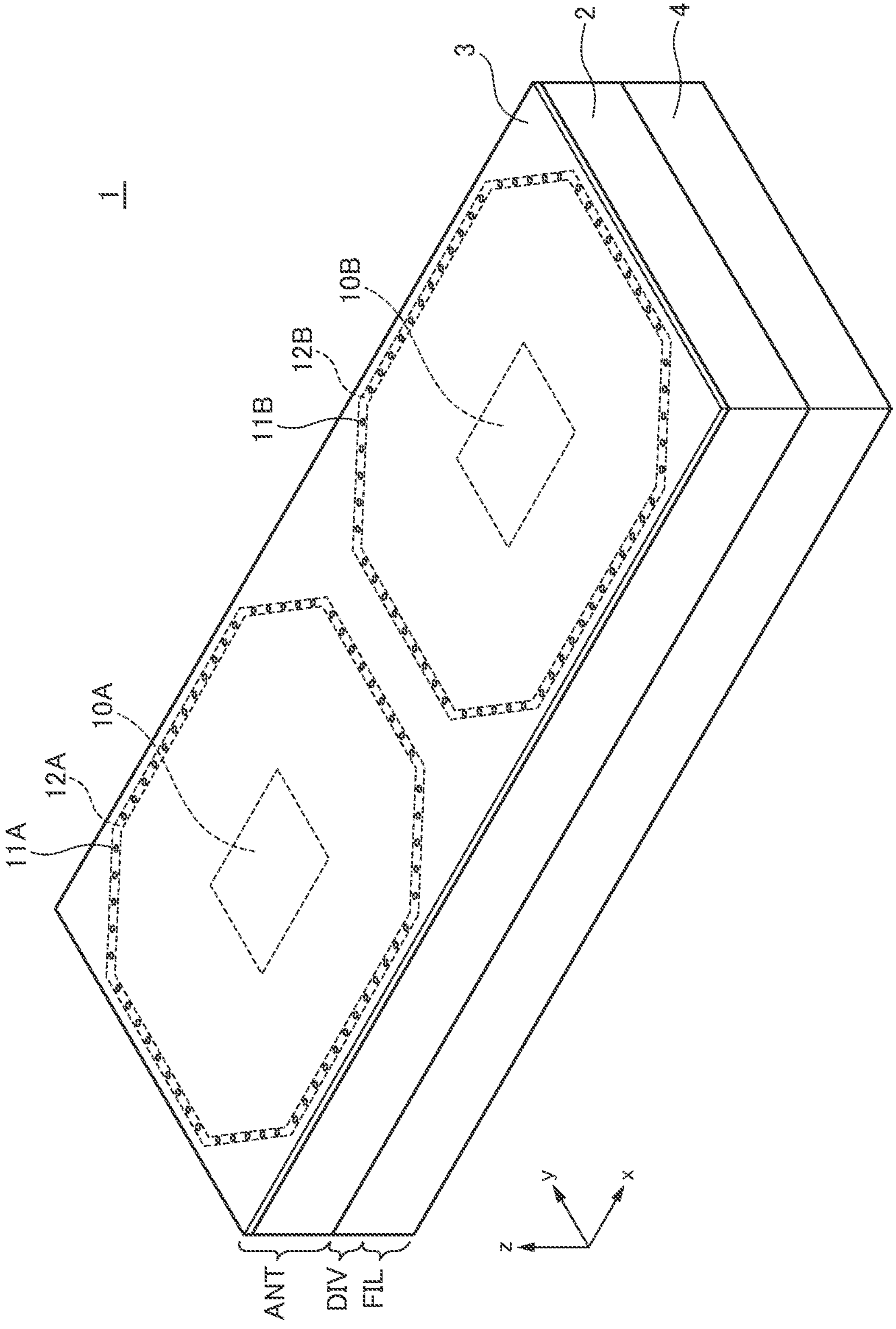
FIG. 1 is a schematic perspective view illustrating the outer appearance of an antenna device 1 as viewed from the radiation surface side thereof according to an embodiment of the present disclosure.
Figure 2:
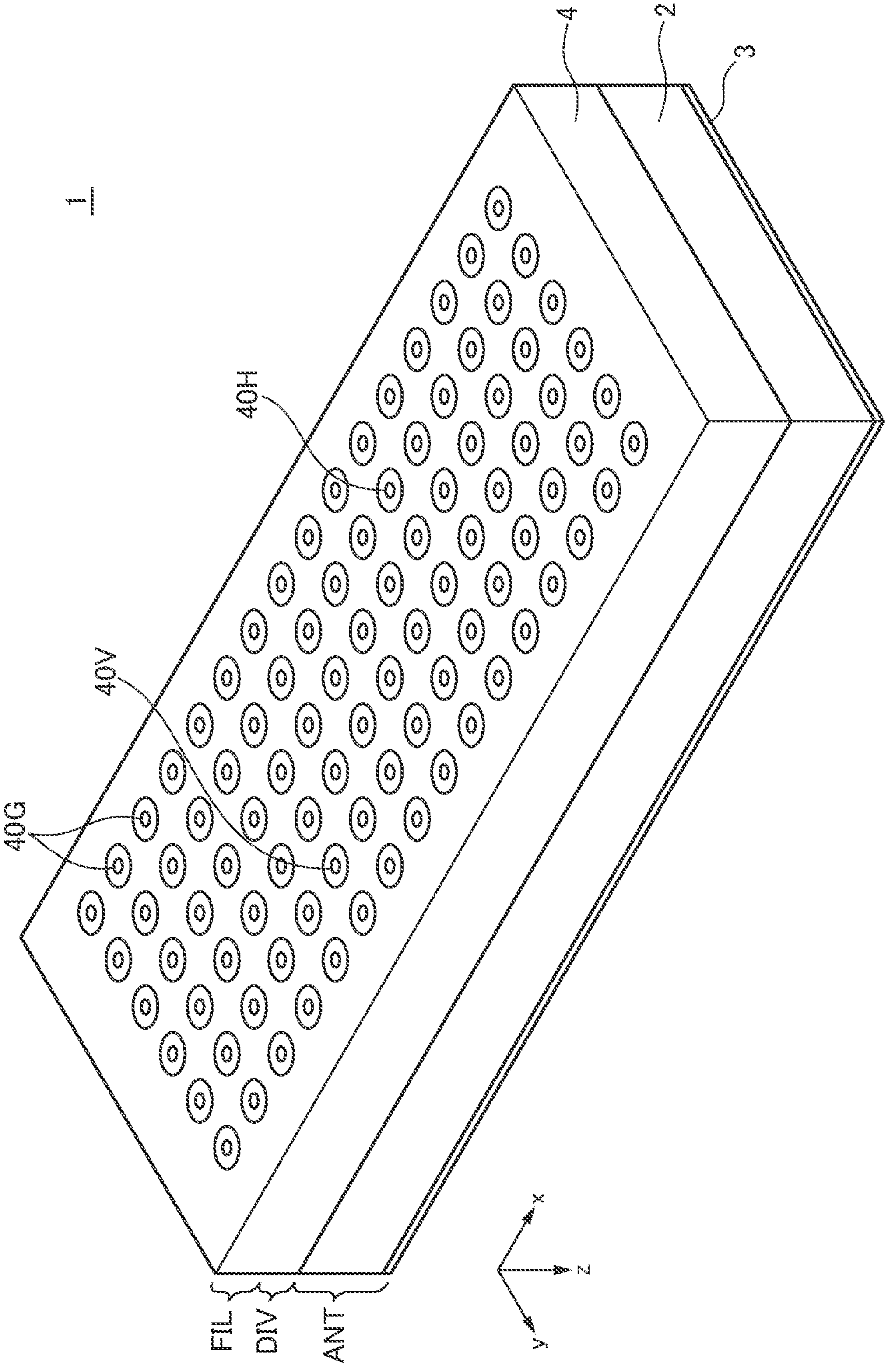
FIG. 2 is a schematic perspective view illustrating the outer appearance of the antenna device 1 as viewed from the mounting surface side thereof according to an embodiment of the present disclosure.

FIGS. 1 and 2 are schematic perspective views each illustrating the outer appearance of an antenna device 1 according to an embodiment of the present disclosure. FIG. 1 illustrates the antenna device 1 as viewed from the radiation surface side thereof, and FIG. 2 illustrates the antenna device 1 as viewed from the mounting surface side thereof.

As illustrated in FIGS. 1 and 2, the antenna device 1 according to the present embodiment has an antenna layer ANT, a filter layer FIL, and a divider layer DIV interposed between the antenna layer ANT and the filter layer FIL.

The antenna layer ANT has dielectrics 2, 3 and radiation conductors 10A, 10B. The radiation conductors 10A and 10B are embedded in the dielectric 3. The antenna layer ANT further has a plurality of ground pillars 11A and a plurality of ground pillars 11B. The ground pillars 11A and 11B surround the radiation conductors 10A and 10B, respectively, as viewed from above in the stacking direction (z-direction). The ground pillars 11A and 11B are pillar conductors that extend in the z-direction so as to penetrate the dielectric 2. The plurality of ground pillars 11A and the plurality of ground pillars 11B are connected to a ground ring 12A and a ground ring 12B, respectively, in a predetermined xy plane. Feed conductors to be described later are provided in a space surrounded by the plurality of ground pillars 11A and in a space surrounded by the plurality of ground pillars 11B.

The filter layer FIL and divider layer DIV include a dielectric 4 and conductor patterns embedded in the dielectric 4. The details of the filter layer FIL and divider layer DIV will be described later. The dielectric material of the dielectric 4 has a dielectric constant higher than the dielectric material of the dielectric 2. The dielectric material of the dielectric 3 may be the same as the dielectric material of the dielectric 4. The filter layer FIL serves as the mounting surface against a motherboard. The mounting surface is provided with signal terminals 40V, 40H, and a plurality of ground terminals 40G. The signal terminal 40V is a terminal for inputting/outputting a vertically polarized antenna signal, and the signal terminal 40H is a terminal for inputting/outputting a horizontally polarized antenna signal. The ground terminals 40G are applied with a ground potential.

Figure 3:
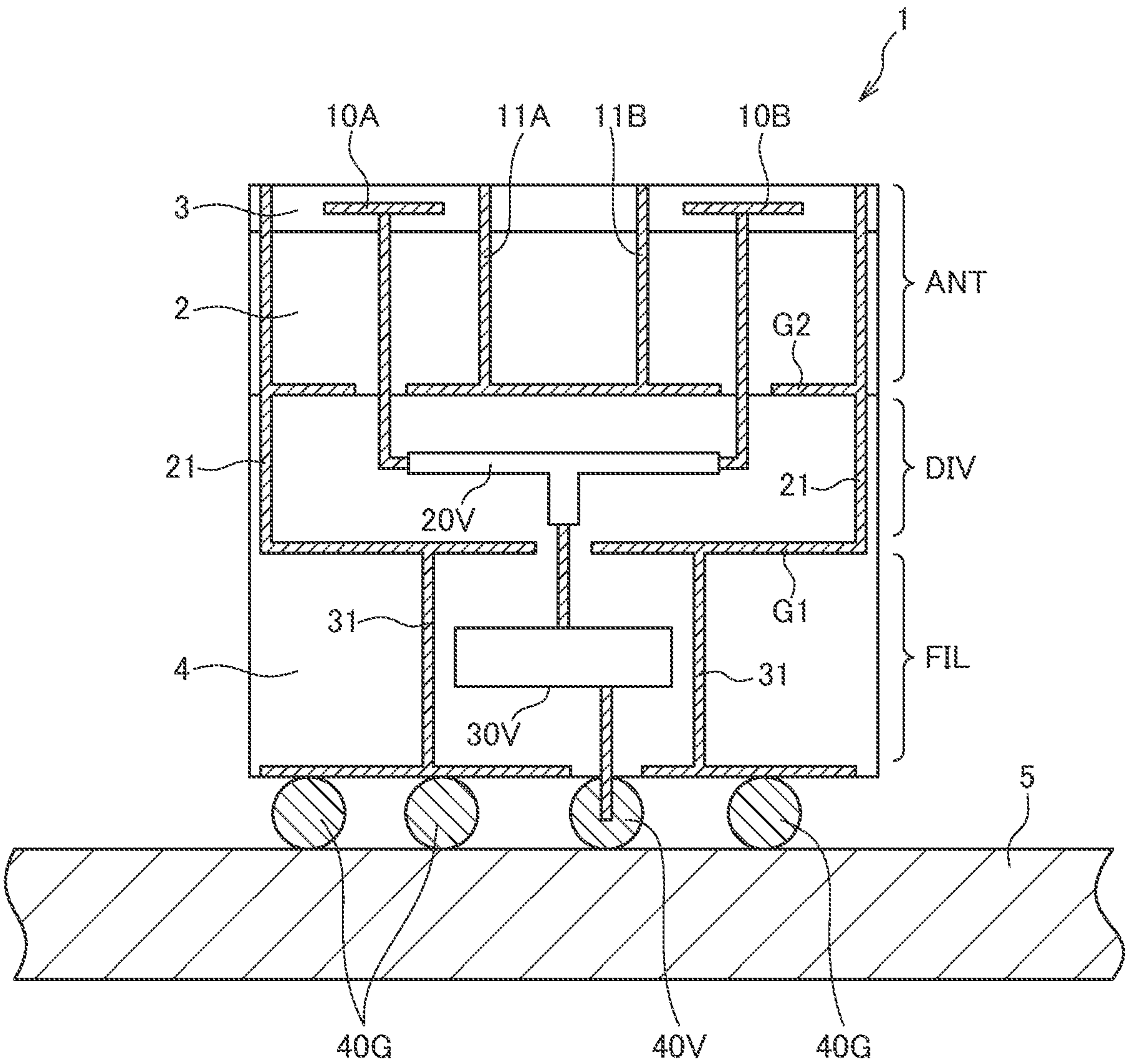
FIG. 3 is a schematic view for explaining the internal structure of the antenna device 1 according to an embodiment of the present disclosure, which schematically illustrates a state where the antenna device 1 is mounted on a motherboard 5.

FIG. 3 is a schematic view for explaining the internal structure of the antenna device 1 according to the present embodiment, which schematically illustrates a state where the antenna device 1 is mounted on a motherboard 5.

As illustrated in FIG. 3, a ground pattern G1 is provided between the filter layer FIL and the divider layer DIV, and a ground pattern G2 is provided between the divider layer DIV and the antenna layer ANT. The ground pattern G1 is embedded in the dielectric 4. The ground pattern G2 is provided at the interface between the dielectrics 4 and 2.

The filter layer FIL has a filter circuit 30V. The filter circuit 30V is a band-pass filter and is connected to the signal terminal 40V. The filter circuit 30V is surrounded by a plurality of ground pillars 31 as viewed from above in the stacking direction. Although not illustrated in FIG. 3, the filter layer FIL includes another filler circuit connected to the signal terminal 40H.

The divider layer DIV has a divider circuit 20V. The divider circuit 20V is a circuit for distributing an antenna signal fed from the filter circuit 30V to the radiation conductors 10A and 10B. The divider circuit 20V is surrounded by a plurality of ground pillars 21 as viewed from above in the stacking direction. Although not illustrated in FIG. 3, the divider layer DIV includes another divider circuit connected to another filter circuit.

Figure 4:
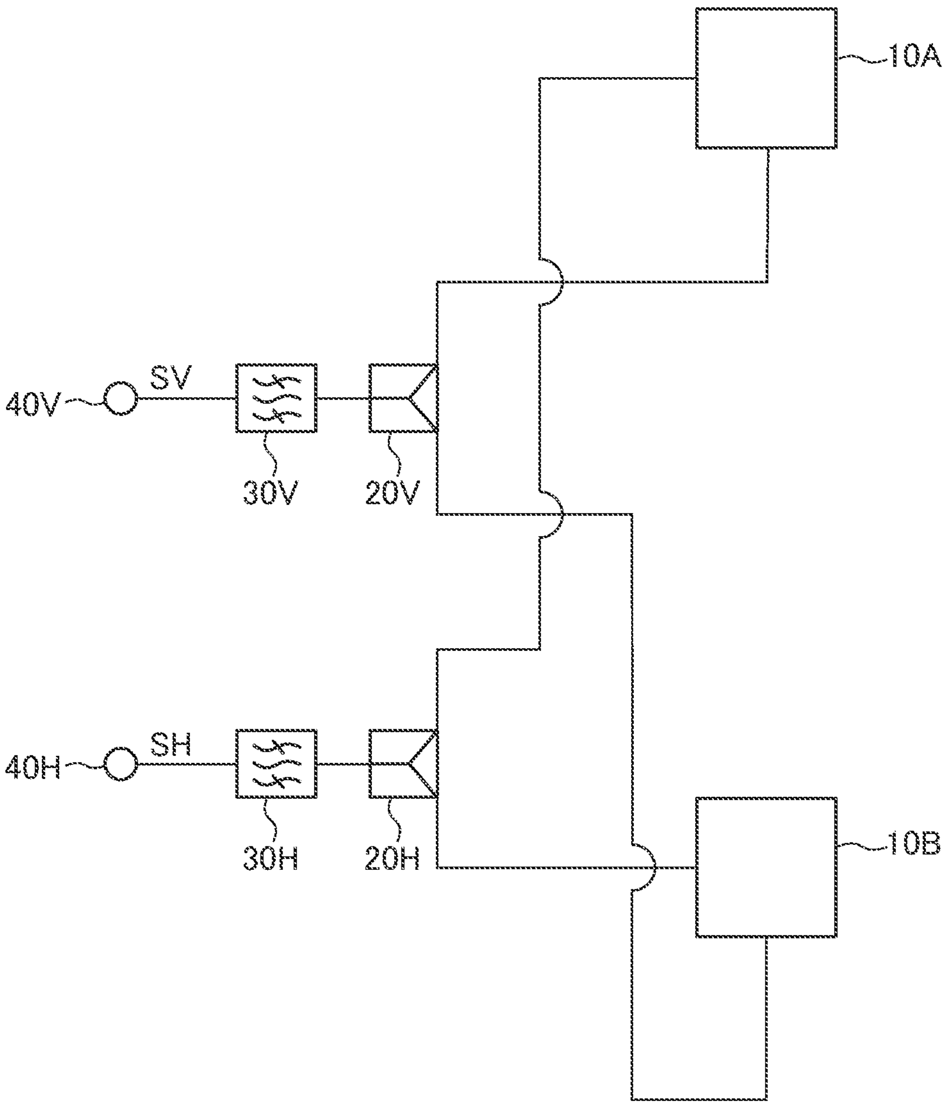
FIG. 4 is a circuit diagram of the antenna device 1 according to the present embodiment.

FIG. 4 is a circuit diagram of the antenna device 1 according to the present embodiment.

As illustrated in FIG. 4, an antenna signal SV fed to the signal terminal 40V is fed to the divider circuit 20V through the filter circuit 30V. The divider circuit 20V distributes the received antenna signal SV to the radiation conductors 10A and 10B. On the other hand, an antenna signal SH fed to the signal terminal 40H is fed to a divider circuit through a filter circuit 30H. The divider circuit 20H distributes the received antenna signal SH to the radiation conductors 10A and 10B.

Figure 5:
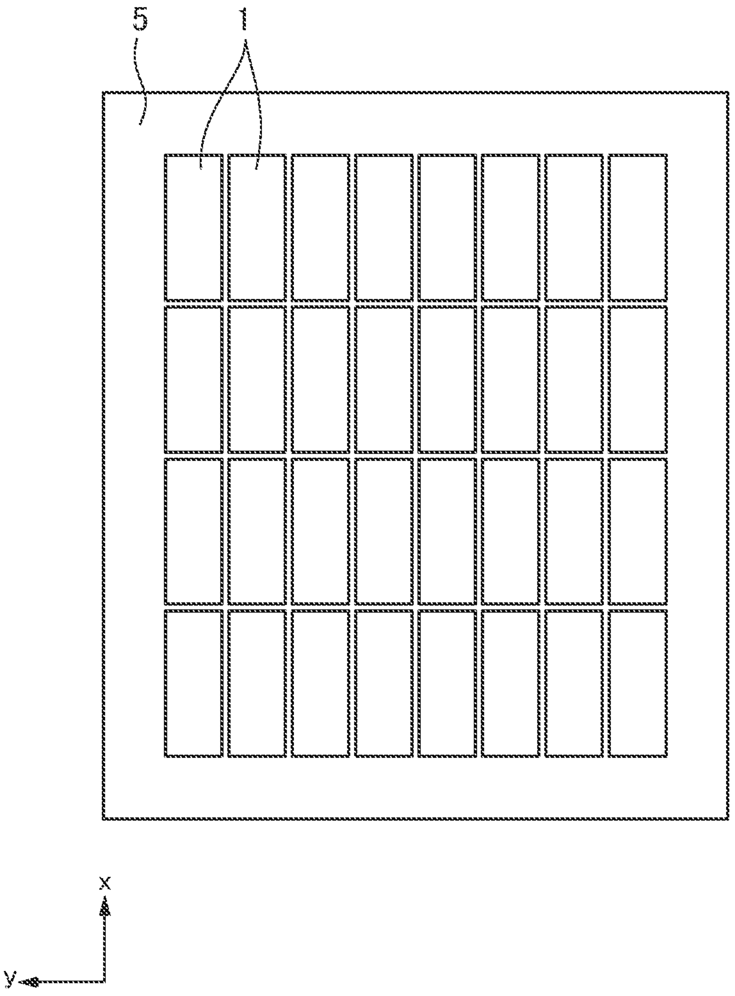
FIG. 5 is a schematic plan view illustrating a state where plural antenna devices 1 are arranged on the motherboard 5 in array.

The feeding positions of the antenna signals SV and SH with respect to the radiation conductor 10A differ from each other by 90°. Similarly, the feeding positions of the antenna signals SV and SH with respect to the radiation conductor differ from each other by 90°. As a result, the antenna signals SV and SH are each radiated to the air from the two radiation conductors 10A and 10B. The antenna devices 1 according to the present embodiment may be arranged in an array on the motherboard 5, as illustrated in FIG. 5. By thus arranging the plurality of antenna devices 1 in an array, a so-called phased-array configuration can be achieved, making it possible to change the direction of a beam as desired.

The following describes the details of the internal structure of the antenna device 1 according to the present embodiment.

Figure 6:
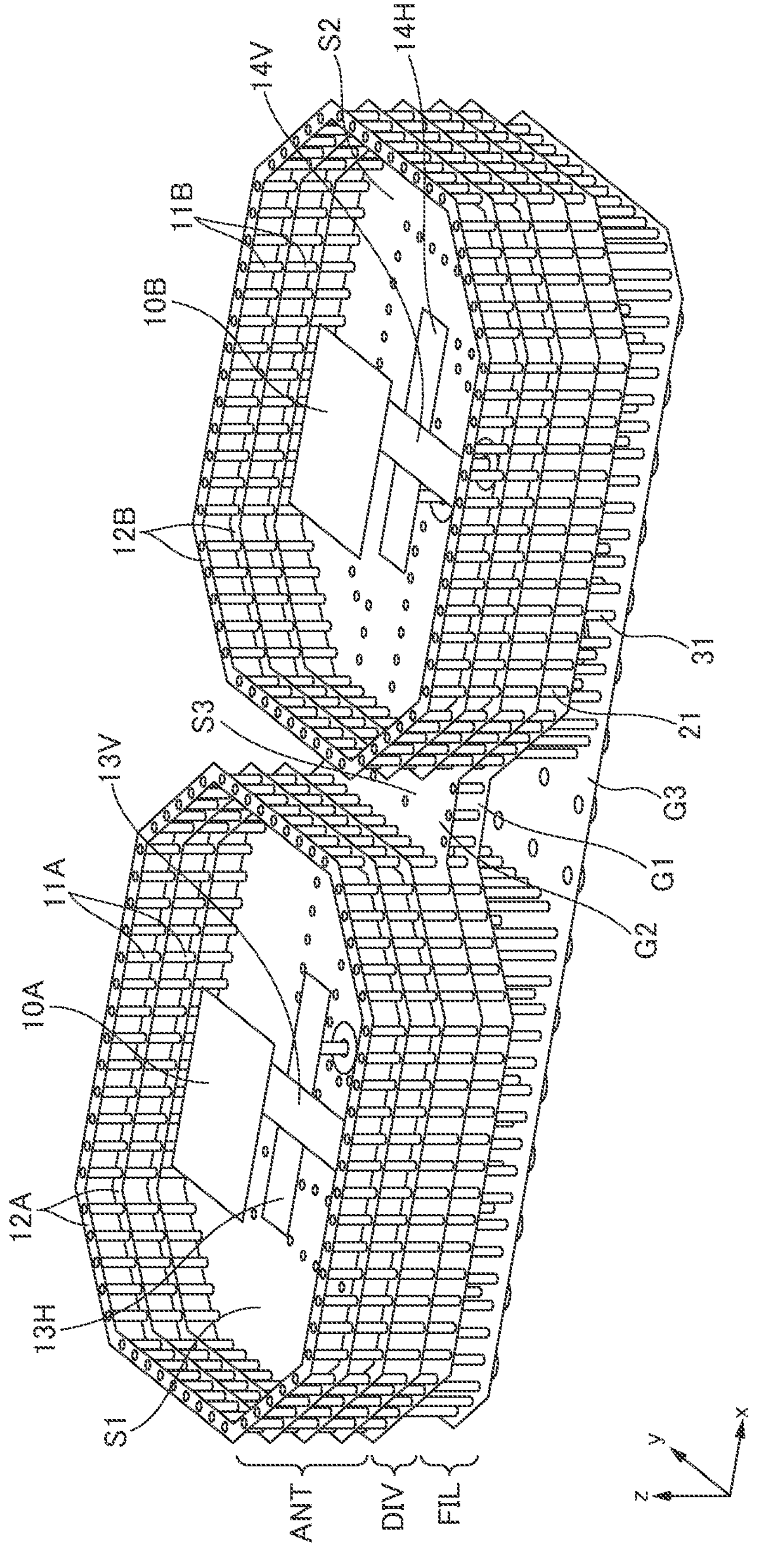
FIG. 6 is a schematic perspective view illustrating the antenna device 1 from which the dielectrics 2 to 4 have been removed.

FIG. 6 is a schematic perspective view illustrating the antenna device 1 from which the dielectrics 2 to 4 have been removed.

As illustrated in FIG. 6, the space surrounded by the plurality of ground pillars 11A is provided with feed conductors 13V and 13H that overlap the radiation conductor as viewed in the z-direction. The feed conductor 13V is a conductor pattern elongated in the y-direction and feeds the antenna signal SV of vertical polarization to the radiation conductor 10A. The feed conductor 13H is a conductor pattern elongated in the x-direction and feeds the antenna signal SH of horizontal polarization to the radiation conductor 10A. The feeding position of the feed conductor 13V with respect to the radiation conductor 10A differs by from the feeding position of the feed conductor 13H with respect to the radiation conductor 10A.

Similarly, the space surrounded by the plurality of ground pillars 11B is provided with feed conductors 14V and 14H that overlap the radiation conductor 10B as viewed in the z-direction. The feed conductor 14V is a conductor pattern elongated in the y-direction and feeds the antenna signal SV of vertical polarization to the radiation conductor The feed conductor 14H is a conductor pattern elongated in the x-direction and feeds the antenna signal SH of horizontal polarization to the radiation conductor 10B. The feeding position of the feed conductor 14V with respect to the radiation conductor 10B differs by 90° from the feeding position of the feed conductor 14H with respect to the radiation conductor 10B.

Large area ground patterns G1 to G3 are provided below the antenna layer ANT. The area sandwiched between the ground patterns G1 and G2 corresponds to the divider layer DIV. The ground patterns G1 and G2 are connected to each other by the plurality of ground pillars 21. The ground patterns G1 and G2 each have an area S1 that overlaps the space surrounded by the plurality of ground pillars 11A as viewed from above in the z-direction, an area S2 that overlaps the space surrounded by the plurality of ground pillars 11B as viewed from above in the z-direction, and an area S3 that connects the areas S1 and S2. The width dimension of the area S3 in the y-direction is smaller than the width dimensions of the areas S1 and S2 in the y-direction. With this configuration, mutual interference between the radiation conductors 10A and 10B through the ground patterns G1 and G2 is reduced, thereby enhancing the independency of the radiation conductors 10A and 10B from each other.

The area sandwiched between the ground patterns G1 and G3 corresponds to the filter layer FIL. The ground patterns G1 and G3 are connected to each other by the plurality of ground pillars 31. The width dimension of the ground pattern G3 in the y-direction may be constant.

Figure 7:
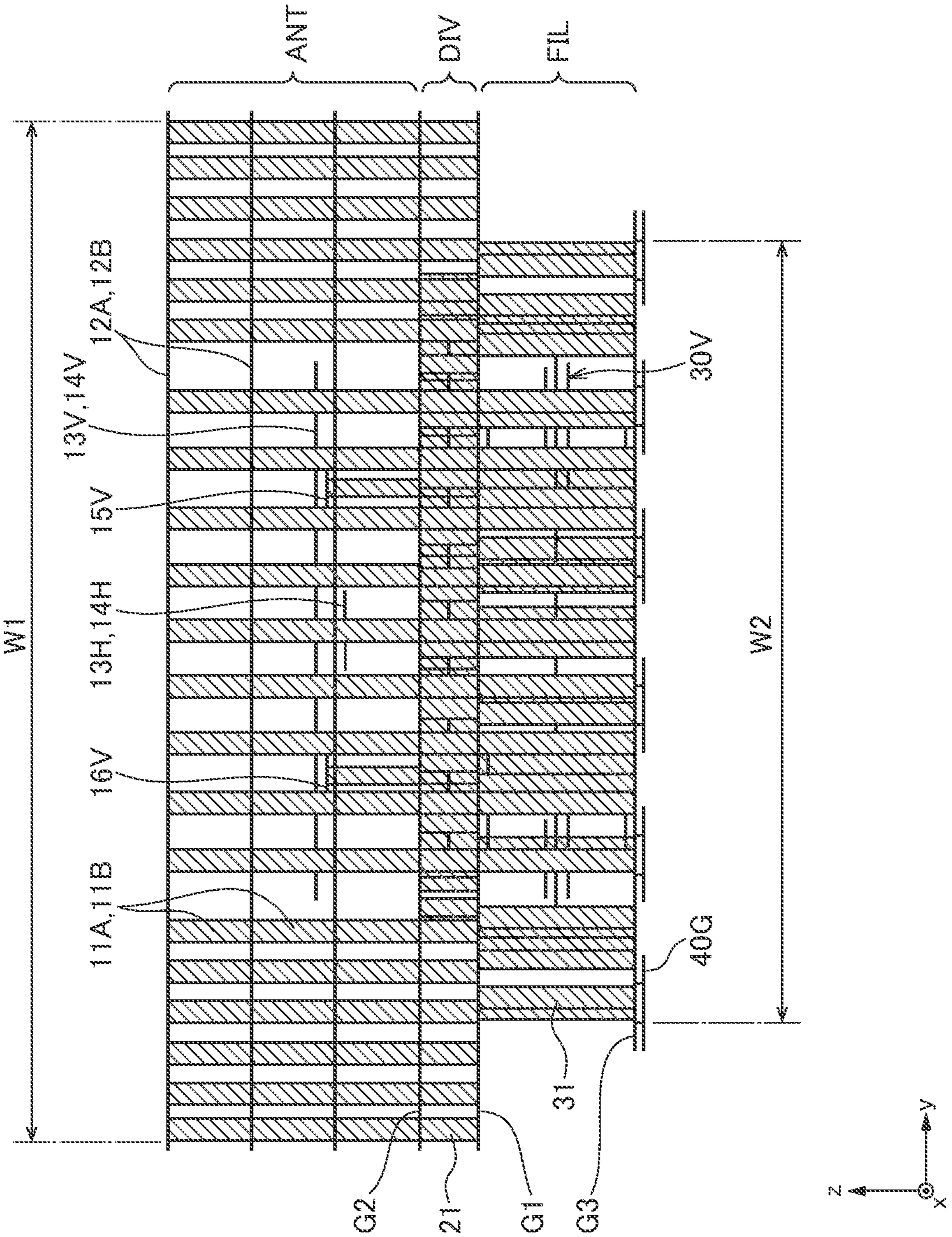
FIG. 7 is a schematic side view of the antenna device 1 as viewed in the x-direction and illustrates the antenna device 1 from which the dielectrics 2 to 4 have been removed.

FIG. 7 is a schematic side view of the antenna device 1 as viewed in the x-direction and illustrates the antenna device 1 from which the dielectrics 2 to 4 have been removed.

As illustrated in FIG. 7, assuming that the y-direction width dimension of the area surrounded by the ground pillars 11A, 11B, and 21 is W1 and that the y-direction width dimension of the area surrounded by the ground pillars 31 is W2, W1>W2 is satisfied in the present embodiment. This reduces a current flowing in the ground terminals 40G from the ground pillars 11A and 11B through the ground pillars 31, thereby improving antenna characteristics.

Figure 8:
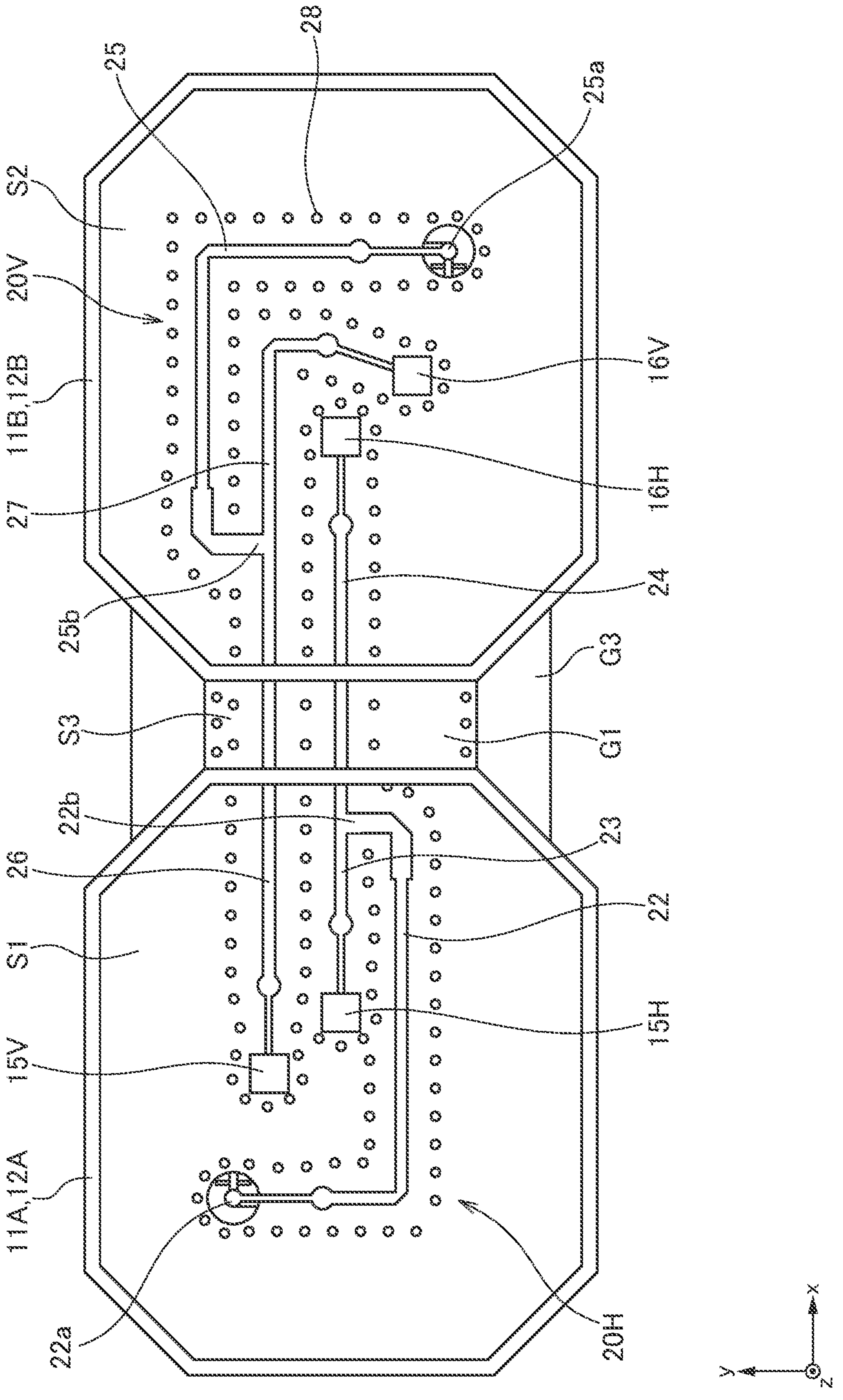
FIG. 8 is a schematic plan view for explaining the configuration of the divider layer DIV.

FIG. 8 is a schematic plan view for explaining the configuration of the divider layer DIV.

As illustrated in FIG. 8, the divider layer DIV has the divider circuits 20V and 20H. The divider circuit 20H includes a common line section 22 and branch line sections 23 and 24, and the divider circuit 20V includes a common line section 25 and branch line sections 26 and 27. One end 22*a* of the common line section 22 constituting the divider circuit 20H is connected to the filter circuit 30H through an opening formed in the ground pattern G1. Similarly, one end 25*a* of the common line section 25 constituting the divider circuit 20V is connected to the filter circuit 30V through an opening formed in the ground pattern G1.

The branch line sections 23 and 24 constituting the divider circuit 20H are lines branching from the common line section 22 with the other end 22*b* thereof as a starting point. The end portion of the branch line section 23 is connected to a capacitance pattern 15H included in the antenna layer ANT, and the end portion of the branch line section 24 is connected to a capacitance pattern 16H included in the antenna layer ANT. The branch line sections 26 and 27 constituting the divider circuit 20V are lines branching from the common line section 25 with the other end 25*b* thereof as a starting point. The end portion of the branch line section 26 is connected to a capacitance Vpattern 15V included in the antenna layer ANT, and the end portion of the branch line section 27 is connected to a capacitance pattern 16V included in the antenna layer ANT. The divider layer DIV further has a plurality of ground pillars 28, which are provided along the common line sections 22, 25 and branch line sections 23, 24, 26, and 27 so as to surround them.

The capacitance pattern 15H is capacitively coupled to the feed conductor 13H, whereby the antenna signal SH fed through the filter circuit 30H, common line section 22, and branch line section 23 is fed to the feed conductor 13H. The capacitance pattern 16H is capacitively coupled to the feed conductor 14H, whereby the antenna signal SH fed through the filter circuit 30H, common line section 22, and branch line section 24 is fed to the feed conductor 14H. The feeding position of the feed conductor 13H with respect to the radiation conductor 10A differs by 180° from the feeding position of the feed conductor 14H with respect to the radiation conductor 10B. Thus, when antenna signals SH having the same phase are fed to the radiation conductors 10A and 10B, the energy radiated from the radiation conductor and the energy radiated from the radiation conductor 10B cancel each other. However, in the present embodiment, the branch line section 23 is shorter than the branch line section 24, and thus antenna signals SH whose phases are reversed by 180° from each other are fed to the radiation conductors 10A and 10B, with the result that the energy radiated from the radiation conductor 10A and the energy radiated from the radiation conductor 10B reinforce each other.

Similarly, the capacitance pattern 15V is capacitively coupled to the feed conductor 13V, whereby the antenna signal SV fed through the filter circuit 30V, common line section and branch line section 26 is fed to the feed conductor 13V. The capacitance pattern 16V is capacitively coupled to the feed conductor 14V, whereby the antenna signal SV fed through the filter circuit 30V, common line section 25, and branch line section 27 is fed to the feed conductor 14V. The feeding position of the feed conductor 13V with respect to the radiation conductor 10A differs by 180° from the feeding position of the feed conductor 14V with respect to the radiation conductor 10B. Thus, when antenna signals SV having the same phase are fed to the radiation conductors 10A and 10B, the energy radiated from the radiation conductor and the energy radiated from the radiation conductor 10B cancel each other. However, in the present embodiment, the branch line section 27 is shorter than the branch line section 26, and thus antenna signals SV whose phases are reversed by 180° from each other are fed to the radiation conductors 10A and 10B, with the result that the energy radiated from the radiation conductor 10A and the energy radiated from the radiation conductor 10B reinforce each other.

The other end 22*b* of the common line section 22, which is the branch point of the divider circuit 20H, is provided at a position overlapping the space surrounded by the ground pillar 11A as viewed from above in the z-direction, i.e., a position overlapping the area S1 of each of the ground patterns G1 and G2. On the other hand, the other end 25*b* of the common line section 25, which is the branch point of the divider circuit 20V is provided at a position overlapping the space surrounded by the ground pillars 11B as viewed from above in the z-direction, i.e., a position overlapping the area S2 of each of the ground patterns G1 and G2. With this configuration, only the branch line sections 24 and 26 that linearly extend in the x-direction exist in a position overlapping the area S3 of each of the ground patterns G1 and G2, making it possible to sufficiently reduce the width dimension of the area S3 in the y-direction.

Figure 9:
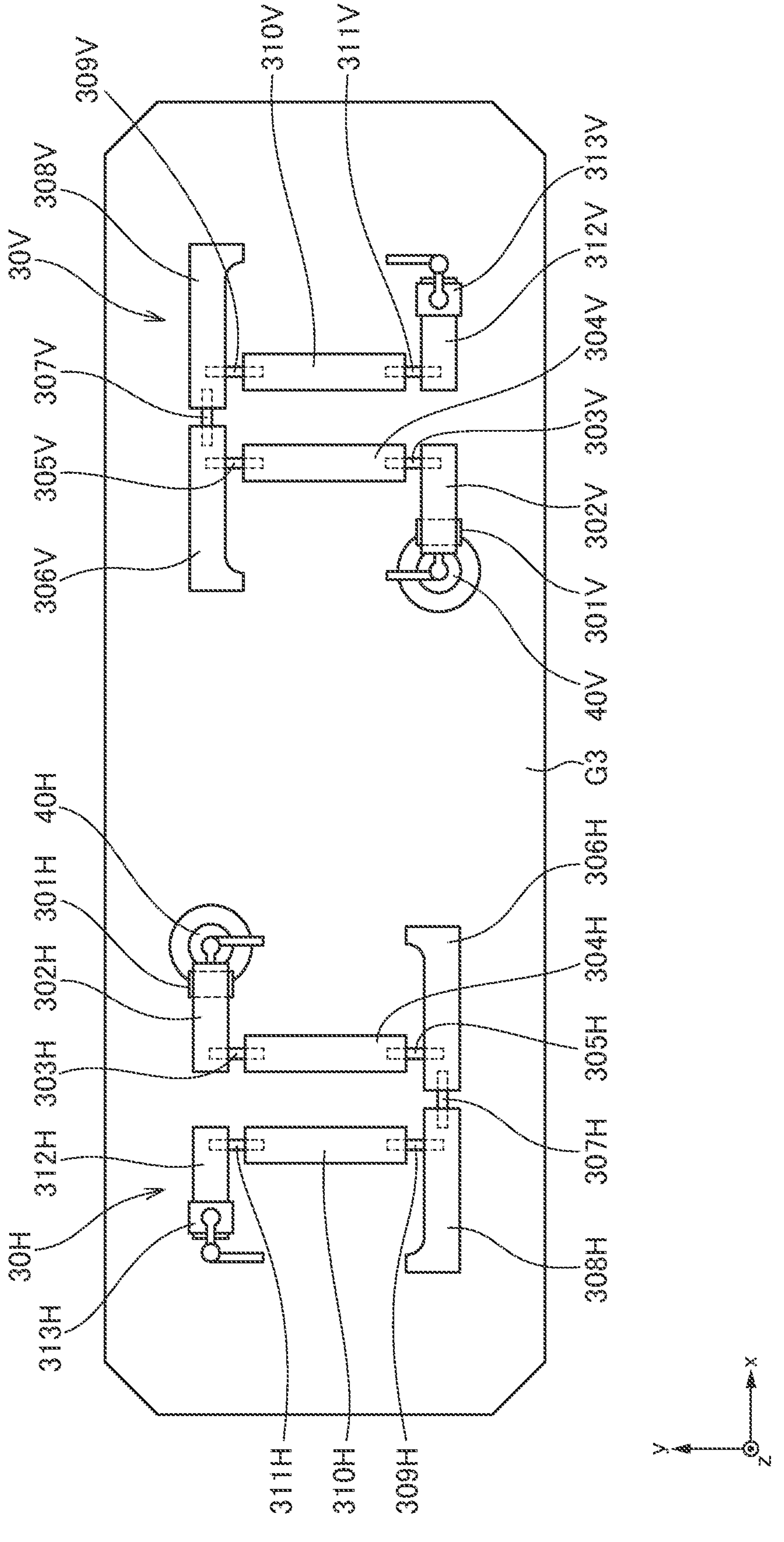
FIG. 9 is a schematic plan view for explaining the configuration of the filter layer FIL.

FIG. 9 is a schematic plan view for explaining the configuration of the filter layer FIL.

As illustrated in FIG. 9, the filter layer FIL has the filter circuits 30V and 30H. The filter circuit 30V includes conductor patterns 301V to 313V, and the filter circuit 30H includes conductor patterns 301H to 313H.

The conductor pattern 301V is connected to the signal terminal 40V and is capacitively coupled to the conductor pattern 302V. The conductor pattern 302V functions as an inductor. The conductor patterns 304V, 306V, 308V, 310V, and 312V each also function as an inductor and are capacitively coupled to one another through the conductor patterns 303V, 305V, 307V, 309V, and 311V. The conductor pattern 313V capacitively coupled to the conductor pattern 312V is connected to the one end 25*a* of the common line section 25 included in the divider circuit 20V through an opening formed in the ground pattern G1.

Similarly, the conductor pattern 301H is connected to the signal terminal 40H and is capacitively connected to the conductor pattern 302H. The conductor pattern 302H functions as an inductor. The conductor patterns 304H, 306H, 308H, 310H, and 312H each also function as an inductor and are capacitively coupled to one another through the conductor patterns 303H, 305H, 307H, 309H, and 311H. The conductor pattern 313H capacitively coupled to the conductor pattern 312H is connected to the one end 22*a* of the common line section 22 included in the divider circuit 20H through an opening formed in the ground pattern G1.

The structure of the antenna device 1 has thus been described. As described above, in the antenna device 1 according to the present embodiment, the antenna signals SV and SH are each fed in common to the two radiation conductors 10A and 10B, so that it suffices to provide the two signal terminals 40V and 40H for inputting the antenna signals SV and SH. Further, the divider layer DIV for distributing the antenna signals SV and SH is sandwiched between the ground patterns G1 and G2, and the area S3 of each of the ground patterns G1 and G2 is reduced, thus making it possible to enhance the independency of the radiation conductors 10A and 10B from each other. In addition, the width dimension in the y-direction of the space surrounded by the ground pillars 31 provided around the filter circuits 30V and 30H is reduced, making it possible to improve antenna characteristics.

It is apparent that the present disclosure is not limited to the above embodiments, but may be modified and changed without departing from the scope and spirit of the disclosure.

As described above, an antenna device according to the present disclosure includes: a filter layer having a first filter circuit; an antenna layer having first and second radiation conductors; a divider layer interposed between the filter layer and the antenna layer, the divider layer having a first divider circuit for distributing a first antenna signal fed from the first filter circuit to the first and second radiation conductors; a first ground pattern provided between the filter layer and the divider layer; and a second ground pattern provided between the divider layer and the antenna layer. The antenna layer further has a plurality of first ground pillars and a plurality of second ground pillars that surround the first radiation conductor and the second radiation conductor, respectively, in a plan view as viewed from a stacking direction. Each of the first and second ground patterns has a first area that overlaps a first space surrounded by the plurality of first ground pillars in a plan view as viewed from the stacking direction, a second area that overlaps a second space surrounded by the plurality of second ground pillars in a plan view as viewed from a stacking direction, and a third area that connects the first and second areas. A width of the third area in a width direction perpendicular to an arrangement direction of the first and second areas is smaller than a width of each of the first and second areas in the width direction.

According to the present disclosure, the first and second ground patterns sandwiching the divider layer are narrowed in the third area, thereby enhancing the independency of the first and second radiation conductors from each other.

In the present disclosure, the filter layer may further have a plurality of third ground pillars that surround the first filter circuit in a plan view as viewed from the stacking direction, and a width of a third space surrounded by the plurality of third ground pillars in the width direction may be smaller than a width of each of the first and second spaces in the width direction. This reduces a current flowing in the third ground pillars from the first and second ground pillars, thereby improving antenna characteristics.

In the present disclosure, the antenna layer may further have a first feed conductor capacitively coupled to the first radiation conductor and a second feed conductor capacitively coupled to the second radiation conductor, the feeding position of the first feed conductor with respect to the first radiation conductor may differ by 180° from the feeding position of the second feed conductor with respect to the second radiation conductor, the first divider circuit may have a first common line section connected to the first filter circuit and first and second branch line sections branching from the first common line section and connected respectively to the first and second feed conductors, and the first branch line section may be shorter than the second branch line section. This prevents the energy radiated from the first radiation conductor and the energy radiated from the second radiation conductor from canceling each other.

In the present disclosure, a first branch point at which the first common line section branches into the first and second branch line sections may be provided at a position overlapping the first area in a plan view as viewed from the stacking direction. This can further reduce the dimension of the third area in the width direction.

In the present disclosure, the filter layer may further have a second filter circuit, the divider layer may further have a second divider circuit for distributing a second antenna signal fed from the second filter circuit to the first and second radiation conductors, the antenna layer may further have a third feed conductor capacitively coupled to the first radiation conductor and a fourth feed conductor capacitively coupled to the second radiation conductor, a feeding position of the third feed conductor with respect to the first radiation conductor may differ by 90° from the feeding position of the first feed conductor with respect to the first radiation conductor, a feeding position of the fourth feed conductor with respect to the second radiation conductor may differ by 90° from the feeding position of the second feed conductor with respect to the second radiation conductor, the feeding position of the third feed conductor with respect to the first radiation conductor may differ by 180° from the feeding position of the fourth feed conductor with respect to the second radiation conductor, the second divider circuit may have a second common line section connected to the second filter circuit and third and fourth branch line sections branching from the second common line section and connected respectively to the third and fourth feed conductors, and the fourth branch line section may be shorter than the third branch line section. This prevents the energy radiated from the first radiation conductor and the energy radiated from the second radiation conductor from canceling each other.

In the present disclosure, a second branch point at which the second common line section branches into the third and fourth branch line sections may be provided at a position overlapping the second area in a plan view as viewed from the stacking direction. This can further reduce the dimension of the third area in the width direction.

In the present disclosure, a dielectric material constituting the antenna layer may differ from a dielectric material constituting each of the filter layer and the divider layer. This makes it possible to achieve both favorable antenna characteristics and filter characteristics.

According to the present disclosure, it is possible to enhance the independency of two radiation conductors from each other in an antenna device of a type in which a single filter circuit is shared among two or more radiation conductors.

What is claimed is:

1. An antenna device comprising:

an antenna layer having first and second radiation conductors; and a ground pattern provided below the antenna layer, wherein the antenna layer further has:

a plurality of first ground pillars surrounding the first radiation conductor in a plan view as viewed from a stacking direction; and a plurality of second ground pillars different from the plurality of first ground pillars, the plurality of second ground pillars surrounding the second radiation conductor in a plan view as viewed from the stacking direction, and wherein the ground pattern has a first area that overlaps a first space surrounded by the plurality of first ground pillars in a plan view as viewed from the stacking direction, a second area that overlaps a second space surrounded by the plurality of second ground pillars in a plan view as viewed from the stacking direction, and a third area that connects the first and second areas.

2. The antenna device as claimed in claim 1, wherein a width of the third area in a width direction perpendicular to an arrangement direction of the first and second areas is smaller than a width of each of the first and second areas in the width direction.

3. The antenna device as claimed in claim 1, wherein the antenna layer further has a first feed conductor capacitively coupled to the first radiation conductor and a second feed conductor capacitively coupled to the second radiation conductor.

4. The antenna device as claimed in claim 3, further comprising a divider layer stacked with the antenna layer, the divider layer having a first divider circuit for distributing a first antenna signal to the first and second radiation conductors.

5. The antenna device as claimed in claim 4, wherein a first feeding position of the first feed conductor with respect to the first radiation conductor differs by 180° from a second feeding position of the second feed conductor with respect to the second radiation conductor, wherein the first divider circuit has a first common line section and first and second branch line sections branching from the first common line section and connected respectively to the first and second feed conductors, and wherein the first branch line section is shorter than the second branch line section.

6. The antenna device as claimed in claim 5, wherein a first branch point at which the first common line section branches into the first and second branch line sections is provided at a position overlapping the first area in a plan view as viewed from the stacking direction.

7. The antenna device as claimed in claim 4, wherein the divider layer further has a second divider circuit for distributing a second antenna signal to the first and second radiation conductors, wherein the antenna layer further has a third feed conductor capacitively coupled to the first radiation conductor and a fourth feed conductor capacitively coupled to the second radiation conductor, wherein the first feed conductor is disposed on a first planar position different from a third planar position on which the third feed conductor is disposed, and wherein the second feed conductor is disposed on a second planar position different from a fourth planar position on which the fourth feed conductor is disposed.

8. The antenna device as claimed in claim 7, wherein a third feeding position of the third feed conductor with respect to the first radiation conductor differs by 90° from a first feeding position of the first feed conductor with respect to the first radiation conductor, wherein a fourth feeding position of the fourth feed conductor with respect to the second radiation conductor differs by 90° from a second feeding position of the second feed conductor with respect to the second radiation conductor, wherein the third feeding position differs by 180° from the fourth feeding position, wherein the second divider circuit has a second common line section and third and fourth branch line sections branching from the second common line section and connected respectively to the third and fourth feed conductors, and wherein the fourth branch line section is shorter than the third branch line section.

9. The antenna device as claimed in claim 8, wherein a second branch point at which the second common line section branches into the third and fourth branch line sections is provided at a position overlapping the second area in a plan view as viewed from the stacking direction.

10. The antenna device as claimed in claim 4, wherein a dielectric material constituting the antenna layer differs from a dielectric material constituting the divider layer.

11. The antenna device as claimed in claim 1, wherein the antenna layer further has a plurality of first ground rings each connecting the plurality of first ground pillars to one another and a plurality of second ground rings each connecting the plurality of second ground pillars to one another, wherein the plurality of first ground rings are arranged in the stacking direction, and wherein the plurality of second ground rings are arranged in the stacking direction.

12. The antenna device as claimed in claim 1, wherein the antenna layer includes a first dielectric and a second dielectric disposed below the first dielectric, and wherein the first and second radiation conductors embedded in the first dielectric.

13. The antenna device as claimed in claim 1, wherein the plurality of first ground pillars include a first ground pillar array arranged along a first boundary between the first area and the third area, wherein the plurality of second ground pillars include a second ground pillar array arranged along a second boundary between the second area and the third area, and wherein a position of each of the first ground pillars included in the first ground pillar array in a width direction perpendicular to an arrangement direction of the first and second areas is different from a position of each of the second ground pillars included in the second ground pillar array in the width direction.

14. The antenna device as claimed in claim 1, wherein the plurality of first ground pillars include a first ground pillar array and a second ground pillar array arranged in parallel with each other so that the first radiation conductor is sandwiched between the first ground pillar array and the second ground pillar array in a plan view as viewed from the stacking direction, and wherein a position of each of the first ground pillars included in the first ground pillar array in a width direction perpendicular to an arrangement direction of the first and second areas is different from a position of each of the first ground pillars included in the second ground pillar array in the width direction.

15. The antenna device as claimed in claim 1, further comprising a plurality of third ground pillars located on the third area in a plan view as viewed from the stacking direction.

16. The antenna device as claimed in claim 15, wherein some of the plurality of third ground pillars are arranged in line in an arrangement direction of the first and second areas.

17. The antenna device as claimed in claim 16, wherein the some of the plurality of third ground pillars are arranged along an edge of the third area extending in the arrangement direction.

18. The antenna device as claimed in claim 1, wherein the plurality of first ground pillars are arranged in an octagonal shape in a plan view as viewed from the stacking direction.

19. The antenna device as claimed in claim 1, wherein the plurality of first ground pillars include a first one of the first ground pillars and a second one of the first ground pillars, wherein the plurality of second ground pillars include a first one of the second ground pillars, wherein the first one of the first ground pillars and the second one of the first ground pillars are located on a first boundary between the first area and the third area, wherein the first one of the second ground pillars is located on a second boundary between the second area and the third area, wherein the first one of the first ground pillars and the second one of the first ground pillars are adjacent to each other in a width direction perpendicular to an arrangement direction of the first and second areas, and wherein a position of the first one of the second ground pillars in the width direction is located between a position of the first one of the first ground pillars in the width direction and a position of the second one of the first ground pillars in the width direction.

20. The antenna device as claimed in claim 19, wherein the plurality of second ground pillars further include a second one of the second ground pillars, wherein the second one of the second ground pillars is located on the second boundary, wherein the first one of the second ground pillars and the second one of the second ground pillars are adjacent to each other in the width direction, and wherein a position of the first one of the first ground pillars in the width direction is located between a position of the first one of the second ground pillars in the width direction and a position of the second one of the second ground pillars in the width direction.

* * * * *